J. S. CARNAHAN.
ENGINEER'S PLOTTER.
APPLICATION FILED APR. 28, 1915.
1,182,638.
Patented May 9, 1916.
2 SHEETS—SHEET 1.
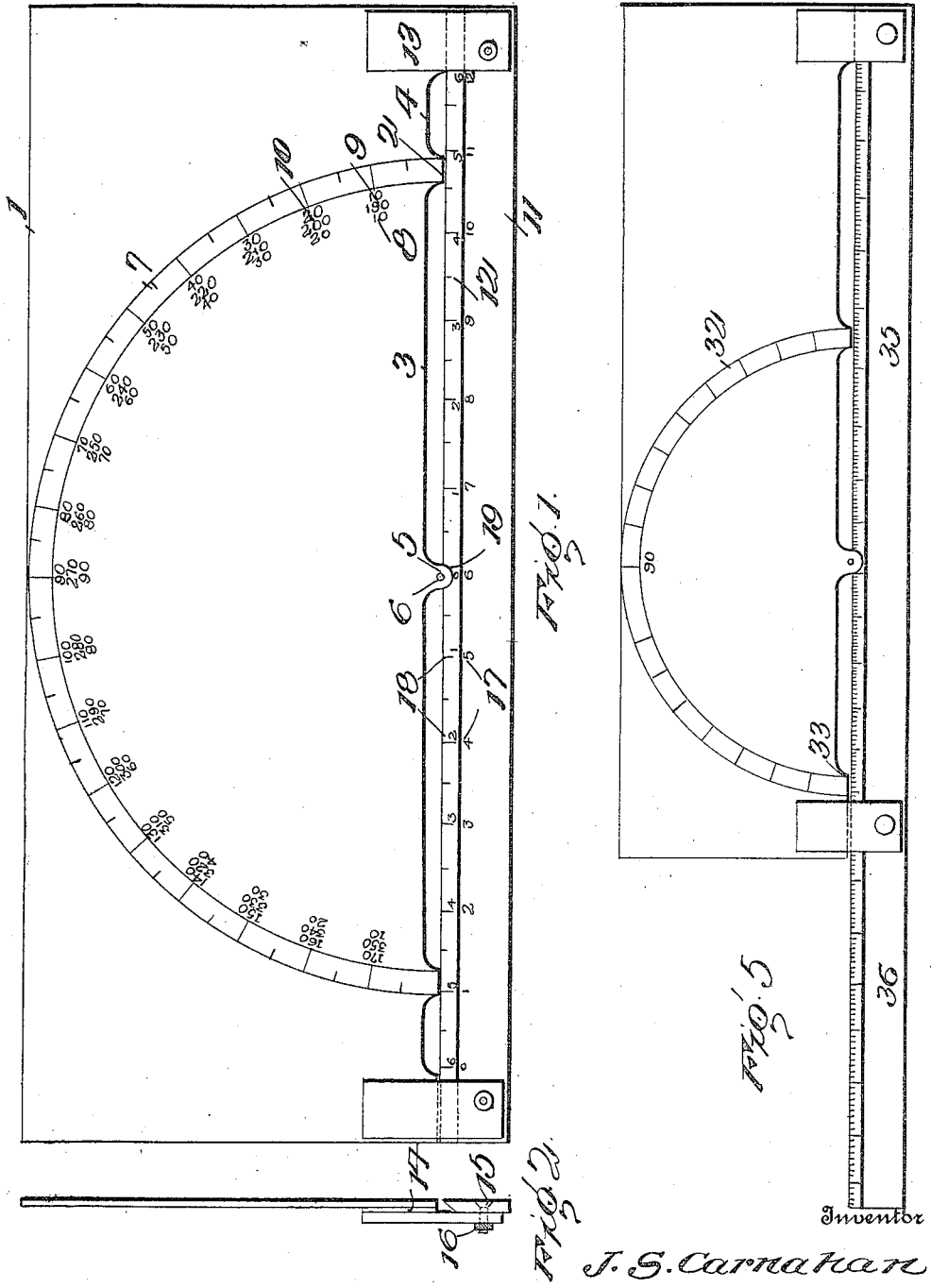
Inventor
J. S. Carnahan
By
Attorneys

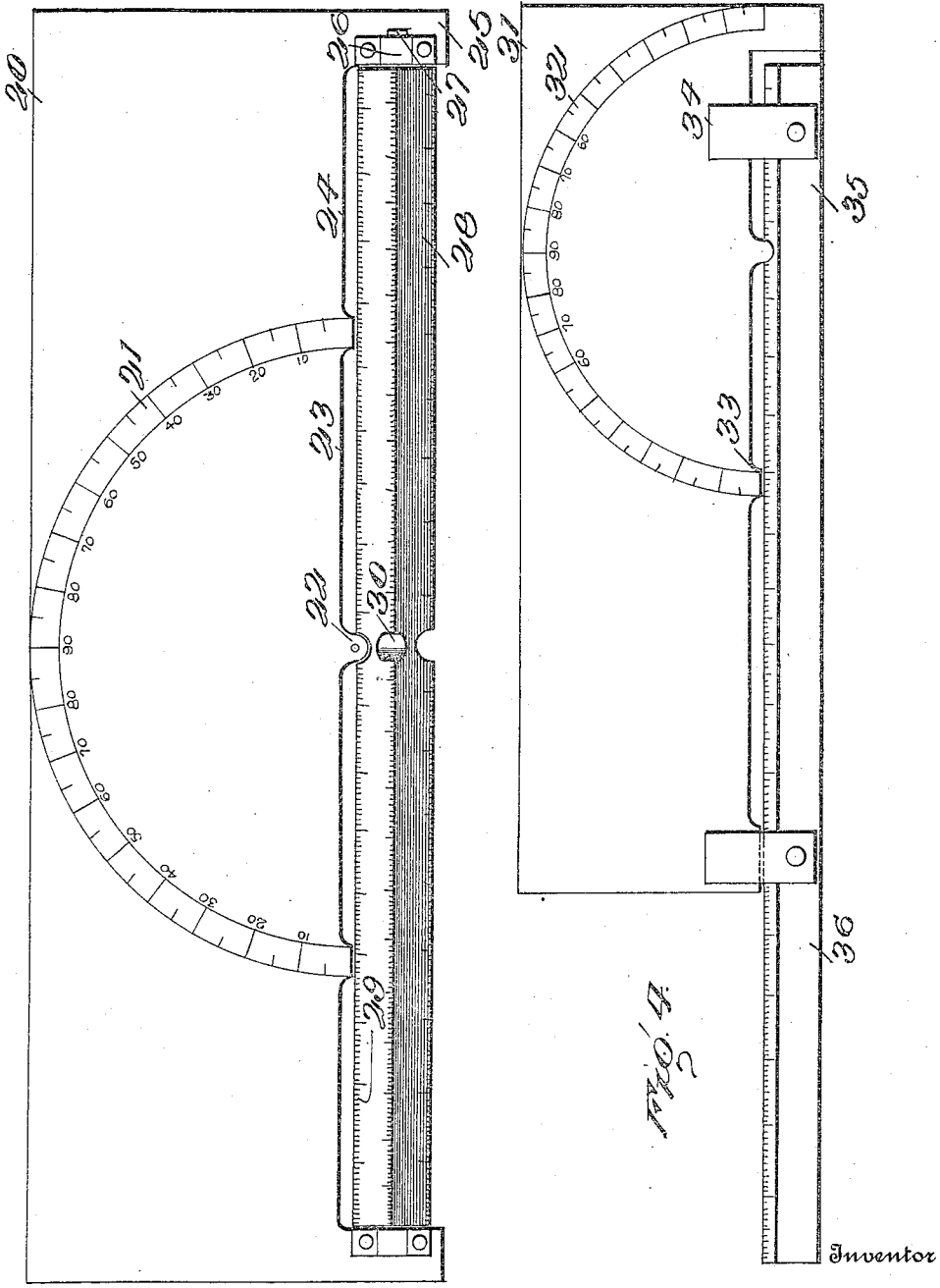

UNITED STATES PATENT OFFICE.

JOHN S. CARNAHAN, OF CADIZ, OHIO.

ENGINEER'S PLOTTER.

1,182,638.   Specification of Letters Patent.   Patented May 9, 1916.

Application filed April 28, 1915. Serial No. 24,557.

*To all whom it may concern:*

Be it known that I, JOHN S. CARNAHAN, a citizen of the United States, residing at Cadiz, in the county of Harrison and State of Ohio, have invented certain new and useful Improvements in Engineers' Plotters, of which the following is a specification.

This invention relates to plotting instruments for use by engineers, and has as its object to provide an instrument of this class by the use of which the desired results may be secured more conveniently and with greater accuracy than by the use of an ordinary protractor and the other drafting instrument usually employed in connection therewith.

It is one aim of the invention to so construct the instrument that the linear scale thereof may be removed and replaced so that a number of variously calibrated scales may be employed in connection with the body of the instrument.

In the accompanying drawings: Figure 1 is a plan view of the instrument embodying the present invention. Fig. 2 is an end elevation thereof. Fig. 3 is a view similar to Fig. 1 illustrating a slightly modified form of the invention. Fig. 4 is a similar view illustrating a further modification. Fig. 5 is a similar view illustrating a still further modification.

Corresponding and like parts are referred to in the following description and indicated in all the views of the drawings by the same reference characters.

In that form of the invention shown in Figs. 1 and 2 the instrument comprises a plate 1 which is of transparent material and which is substantially rectangular. The basal edge of this plate is indicated by the numeral 2 and this edge is, for a purpose to be presently explained, cut in or recessed, as indicated at 3 and 4, and between its recessed portions 3 the plate is formed at its said edge and in its plane with an ear 5 having an aperture 6 located substantially in the line of extent of the basal edge 2 and through which may be inserted a pin to constitute the center about which the plate may be angularly moved in making angular measurements. Upon one face of the plate there is marked the scale for angular measurement, which scale includes an arcuate series of scale marks, indicated at 7, this series being concentric to the opening 6 and terminating at its ends at the basal edge of the plate between the cut in portions 3 and 4. This scale has an extent of 180 degrees, as will be observed by reference to Fig. 1, and the scale marks are identified in a manner which will now be explained. For convenience in referring to the angular scale, it will be considered that the basal edge includes a right hand portion and a left hand portion, which portions are located at corresponding sides of the opening 6, while the scale 7 may be divided into as many subdivisions as desired. Each division of ten degrees is indicated by a suitable set of degree indicating numerals, one of these series of numerals, being indicated at 8, and the numerals of this series ranging from zero to 90 through each half of the basal edge of the scale to the scale mark diametrically opposite the opening 6 and in a line perpendicular to the basal edge of the plate 1. Another series of the numerals, indicated at 9, ranges from zero to 180 from the right hand side of the basal edge of the instrument to the left hand side of the said basal edge. The numerals of the first series, indicated at 8, denote the angular distances of the scale marks, to which they are applied, from the adjacent side of the basal edge of the plate, and the scale marks of the series 9 denote the angular distances from the right hand side of the said basal edge. A third series of numerals, indicated at 10, range from 180 to 360 in ascending order from the right hand side of the basal edge to the left hand side thereof, and these numerals denote the angular distances of the marks from the left hand side of the basal edge of the plate in an anti-clockwise direction. From the foregoing it will be seen that the angular distance of any one of the scale marks from the adjacent side of the basal edge of the plate or from either side of the edge of the plate or from the left hand side of the basal edge in an anti-clockwise direction may be readily determined without calculation.

The instrument further includes a scale for linear measurement, which in that form of the invention shown in Fig. 2 is in the nature of a flat blade, indicated by the numeral 11, and provided with a beveled edge 12. This blade is supported at its ends by attaching plates 13 which are secured in any suitable manner to the upper face of the plate 1 at the ends of the basal edge thereof and project beyond the said edge. In the present instance, suitable fillers 14 are interposed between the attached portions of the plates 13 and the face of the plate 1, depending upon the thickness of the blade 11, although if this blade is relatively thin or of the same thickness as the plate 1, these fillers may be omitted. Small bolts 15 are fitted through the ends of the blade 11 and have threaded upon them nuts 16 which may be tightened to removably secure the blade in place. By reference to Figs. 1 and 2 it will be observed that the beveled edge of the blade 11 is presented toward and substantially coincident with the basal edge of the plate 1, the said edge of the blade being but very slightly spaced from the said edge of the plate. The scale marks upon the beveled edge of the blade 11 are designated, in the present instance, by two series of scale numerals, one series, indicated at 17, ranging in ascending order from zero to 12 and from left to right, and the other series, indicated at 18, ranging from zero toward either end of the said blade in ascending order. It is preferable that the beveled edge of the blade 11 be recessed, as at 19, so as to receive the ear 5, and it will be understood that the cut away portions 3 and 4 of the basal edge of the plate 1 provide for working engagement of a pencil point or pointer with the said beveled edge of the blade.

In that form of the invention shown in Fig. 3 of the drawings, the instrument comprises a plate 20 which corresponds to the plate 1 and which is provided with a scale for angular measurement, indicated at 21, and corresponding to the scale 7. The plate 20 is provided at its basal edge with an ear 22, corresponding to the ear 5, and the said edge of the plate is cut in, as indicated at 23 and 24. In this form of the invention the plate at its lower corners is provided with extensions 25 in which are mounted bearings 26 rotatably receiving trunnions 27 at the ends of a triangular prismatic scale 28. The faces of the scale 28 are provided with a number of scales 29 which are differently divided, and it will be apparent that by turning the scale upon its trunnions, any desired one of the several scales 29 may be brought into working position opposite the basal edge of the plate 20. In order that the scale 28 may be so adjusted it is formed with a number of notches 30 which permit of the scale being turned without likelihood of interference with such movement by the ear 22.

In that form of the invention shown in Fig. 4 of the drawings, the plate is indicated by the numeral 31 and is provided with a scale for angular measurement, indicated at 32, this scale being located at one end of the said plate, or, in other words, having its chordal side displaced laterally with respect to the middle of the plate. The basal edge of the plate 31 is indicated in this figure by the numeral 33 and secured to the upper face of the plate are spaced supporting plates 34 arranged to support the blade of a scale for linear measurement, as in the case of the blade 11, this blade being indicated at 35 and being of a length greater than the length of the plate 21 and adapted to extend at one end beyond the adjacent end of the said plate. While in the present instance the blade 35 projects beyond the left hand end of the plate 31, nevertheless, it will be understood that if desired it might project beyond the right hand end of the said plate.

That form of the invention shown in Fig. 5 is substantially identical with the form shown in Fig. 4, and corresponding parts are indicated by the same reference numerals, the point of difference residing in the location of the scale for angular measurement at the left hand end of the plate 31 instead of at the right hand end of the said plate as in the form shown in Fig. 4.

From the foregoing description of the invention, it will be understood that variously calibrated scales for linear measurement may be provided in connection with a single one of the plates 1 and that these scales may be interchanged whenever desired and may be of the same length as the plate 1 or of greater length than the same. It will furthermore be understood that any suitable means may be provided for supporting the scales for linear measurement and that the means here shown is only intended to be illustrative.

In using the instrument, as for example, in the plotting of a traverse, the instrument is laid over a meridian line drawn on the paper and the linear scale is brought parallel to the first course, by means of the protracting semicircle. A straight edge is then placed against one end of the plate, as for example, the right hand end and the instrument is slid along until the scale passes through the point of departure. The straight edge is then swung around against the long unoccupied side of the plate, as for example, the upper side, and the instrument is then slid along the straight edge until the zero division of the scale coincides with the point of departure, whereupon the distance is pointed off in the desired direction. For the plotting of any number of points surveyed from the same station, the line of reference is drawn through the plotted station and the instrument is laid over this line with the center or opening 6 coinciding with the station. A pin is then inserted through this opening and the scale is swung to each successive angle with the line of reference and the respective distances are marked off. When the scale is to be used in the plotting of points from their coordinates, it is laid on either one of the axes of coördination, so that the distance of the center or opening 6 from the origin or secondary origin, represents the corresponding coördinate, and then after a pin has been inserted through the opening the scale is swung to perpendicular position and the other coördinate is pointed off.

Having thus described the invention, what is claimed as new is:

1. In an instrument of the class described, a scale plate provided with an arcuate scale for angular measurement, one edge of the plate being diametric to the scale, a scale blade, and means for supporting the scale blade parallel to the said edge, the scale blade having a scale for linear measurement, there being a centering medium located between the adjacent edges of the scale plate and blade and concentric to the scale for angular measurement.

2. In an instrument of the class described, a scale plate provided with an arcuate scale for angular measurement, one edge of the plate being diametric to the scale, a scale blade provided with a scale for linear measurement, and means supporting the scale blade in juxtaposition to the said edge of the scale plate, the said supporting means being constructed to permit of substitution of one linear scale for another.

3. In an instrument of the class described, a scale plate provided with an arcuate scale for angular measurement, one edge of the plate being diametric to the scale, a scale blade provided with a scale for linear measurement, the said edge of the plate being cut away, and means supporting the scale blade in juxtaposition to the said edge of the scale plate, there being a centering medium located between the adjacent edges of the scale plate and blade and concentric to the scale for angular measurement.

4. In an instrument of the class described, a rectangular scale plate provided with an arcuate scale for angular measurement, the lower edge of the plate being diametric to the scale, a scale blade provided with a scale for linear measurement, and means for supporting the scale blade in juxtaposition to the said lower edge of the said scale plate, the upper edge of the scale plate being parallel to the lower edge thereof, and the end edges of the scale blade being at right angles to the upper and lower edges of the said plate, the lower edge of the scale blade being parallel to the lower edge of the scale plate.

In testimony whereof I affix my signature in presence of two witnesses.

JOHN S. CARNAHAN. [L. S.]

Witnesses:
D. A. HOLLINGSWORTH,
BARCLAY W. MOORE.

Copies of this patent may be obtained for five cents each, by addressing the "Commissioner of Patents, Washington, D. C."